United States Patent [19]

Bezerie et al.

[11] 3,999,859
[45] Dec. 28, 1976

[54] DEVICE FOR CHECKING RADIO AERIAL NAVIGATIONAL AIDS

[75] Inventors: Jean-Pierre Bezerie, Ville d'Avray; André René Delclaux, Champigny, both of France

[73] Assignee: Societe Anonyme de Telecommunications, Paris, France

[22] Filed: Feb. 19, 1975

[21] Appl. No.: 551,113

[30] Foreign Application Priority Data

Aug. 6, 1974 France .............................. 74.27283

[52] U.S. Cl. .............................. 356/152; 250/199; 340/27 NA; 343/113 R
[51] Int. Cl.² ........................................ G01B 11/26
[58] Field of Search ............... 250/201, 203 R, 199; 356/152, 153, 141; 340/27 NA

[56] References Cited

UNITED STATES PATENTS

| | | | |
|---|---|---|---|
| 2,982,859 | 5/1961 | Steinbrecher ..................... | 250/205 |
| 2,982,958 | 5/1961 | Yulo et al. ..................... | 343/113 R |
| 3,028,598 | 4/1962 | Gibbs et al. ................... | 343/113 R |
| 3,664,748 | 5/1972 | Bezu ................................... | 356/152 |
| 3,696,248 | 10/1972 | Cunningham et al. ........ | 250/203 R |
| 3,893,772 | 7/1975 | Tilly et al. ......................... | 356/141 |

Primary Examiner—Maynard R. Wilbur
Assistant Examiner—S. C. Buczinski

[57] ABSTRACT

The invention concerns a device for checking radio aerial navigational aids.

In the device according to the invention, the infra-red scanning head is mounted on a turret by means of two groups each comprising a tachometric generator-motor unit and an angular coder and respectively mounted along the inclination axis and the bearing axis. The motors are supplied by voltages characteristic of the angular aiming errors furnished, after processing, by the scanning head. The orientable beacon on board the aircraft is controlled by orientation servomotors supplied by a recopying system.

7 Claims, 11 Drawing Figures

$Md_1 = \overline{H \cdot \overline{E}} = \overline{H} + E$
$Md_2 = \overline{Md_1 \cdot M} = \overline{Md_1} + \overline{M}$

DEVICE FOR CHECKING RADIO AERIAL NAVIGATIONAL AIDS

The present invention relates to a device for checking radio aerial navigational aids.

One of the radio aids presently available at airports is the device termed "Instrument Landing System" (ILS).

An ILS transmitter on the ground indicates to the aircraft in the course of its approach the axis of the landing strip ("Localizer") and the ideal approach angle ("Glide"plane). There is also a system which permanently indicates to the aircraft the angle made by the radius passing through a transmitter and the aircraft with a fixed reference axis (device termed "Visual omni-range" or VOR). The device according to the invention is adapted to check the exactness of the data furnished by navigational aids such as ILS and VOR transmitters.

Generally, for carrying out such a checking, a light source is placed on a checking aircraft and this source is followed by means of a theodolite placed on the ground and operated by an operator. The testing aircraft follows as close as possible the indications given by the radio aid to be tested (for example the Localizer axis and the Glide plane in the case of an ILS system). The operator transmits by radio to the testing aircraft the time reference signals and the measurements read on the verniers of the theodolite. This measurement is effected several times in the course of the reading which lasts 2 minutes (ILS) or 15 minutes (VOR).

Thus it concerns a point-by-point measurement carried out manually and transmitted by telephone to the aircraft. Moreover, the light source, placed under the aircraft, must remain visible for a distance of up to 20 km (ILS). Thus it is necessary to stabiize the source by gyroscopic means to disassociate it from the movements of the aircraft.

It has also been proposed to carry out an automatic tracking of an infra-red source placed on board the aircraft by means of an infra-red locator placed on the ground. In this known system the infra-red locator is mounted on a turret which is directed in the plane in which the measurement is not effected and the deviation measurements (ILS) or angular measurements (VOR) are effected in the measuring plane. The measurements thus carried out are transmitted to the aircraft in analog form on the VHF, by employing a transmission channel distinct from the radio telephone with which the apparatus is equipped. In order to avoid that the locator does not lose the infra-red source placed on board the aircraft, this source is controlled by data furnished by the aircraft and/or by the radio aid to be checked.

This system of course works better than the aforementioned manual system, in particular owing to the automatism of the measurements, carried out in real time. However, this known automatic system has certain drawbacks. In particular, the control of the infra-red source by the radio aid being checked may be the origin of a loss of this source, whose beam is narrow in order to economise electrical energy, when the system to be checked is faulty. Further, the need for a special transmission channel and demodulating instruments in the aircraft, increases the size, weight and cost of the airborne equipment.

An object of the present invention is to overcome these drawbacks while increasing the precision of the readings.

According to the invention, there is provided a device for checking radio aerial navigational aids of the type comprising an infra-red locator comprising an infra-red scanning head mounted on a turret on the ground, means for processing data furnished by the scanning head, a VHF transmitter-receiver on the ground, a VHF transmitter-receiver on board a calibrating aircraft, means for processing data received on board said aircraft, and an orientable beacon mounted on board said aircraft, wherein the infra-red scanning head is mounted on the turret by means of two groups each comprising a tachometric generator-motor unit and an angular coder and respectively mounted along the inclination axis and bearing axis, said motor being supplied with voltages which are characteristic of the angular tracking errors furnished, after processing, by the scanning head, the orientable beacon on board the aircraft being controlled by orientation servomotors supplied by a copying system itself supplied by signals which are characteristic of the position of the angular coders of the turret with respect to a gyroscopic reference system in the aircraft which coincides with a reference system on the ground.

In the device according to the invention, the system comprising the infra-red turret and the orientable beacon is a tied system, the alignment on the beacon with the turret being obtained by copying the angular data delivered by the turret which is automatically aimed at this beacon. The turret (locator) thus remains constantly within the beam of the beacon.

In a preferred embodiment, the data transmitted to the receiver of the aircraft are in the digital form. The digital angular readings can be transmitted within the LF spectrum simultaneously with the sound in a single VHF channel by a three-level modulation of a single message comprising integrated synchronization and clock signals. In this way there is avoided the use in the receiver of a synchronized clock and three separating filters for the message, the clock signals and the synchronization signals.

The device according to the invention may also comprise a view-finder, mounted on the scanning head, and aim-correcting means. This embodiment permits, within the framework of the checking of the ILS correcting the "antenna offset" which enables an aircraft to be employed whose antenna has any position with respect to the beacon or an aircraft having a plurality of antennas by effecting the tracking of one thereof.

Preferably, the device comprises means for memorizing the instantaneous angular velocities of the source and the restoration of said angular velocities for driving the motors shifting the scanning head. In this way, should the source is masked, the operator can bring into action the aforementioned means so that the turret follows the theoretical trajectory of the source while it is masked.

The invention will be understood from the ensuing description with reference to the accompanying drawings, in which.

Figure 9:
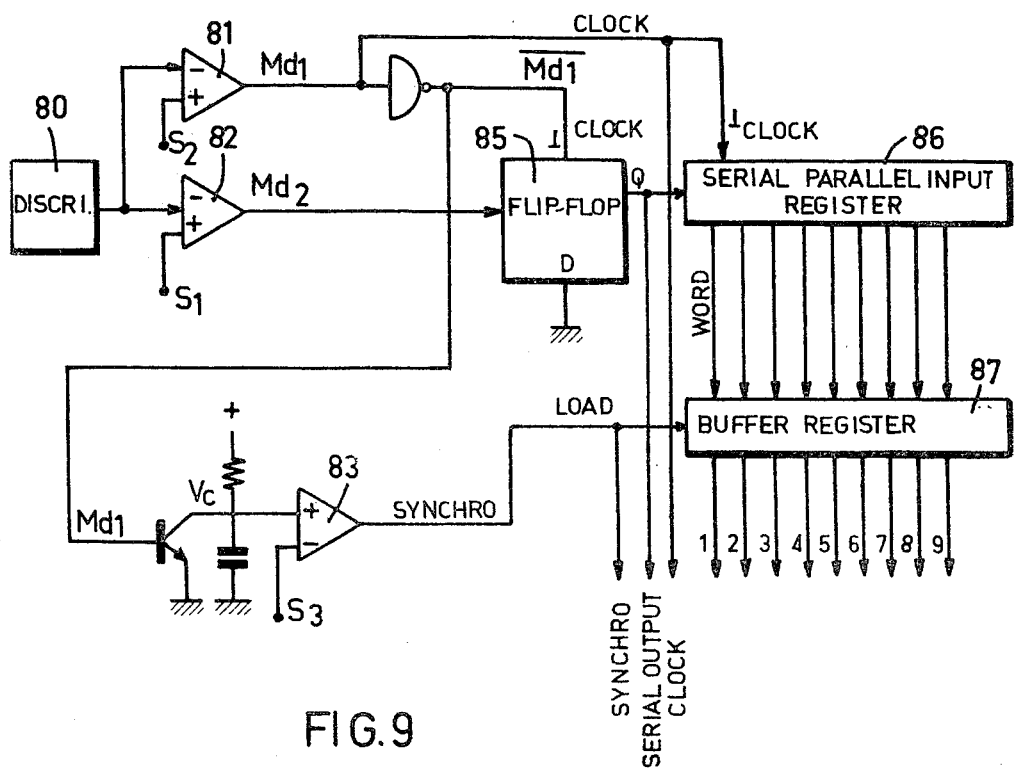
Figure 8:
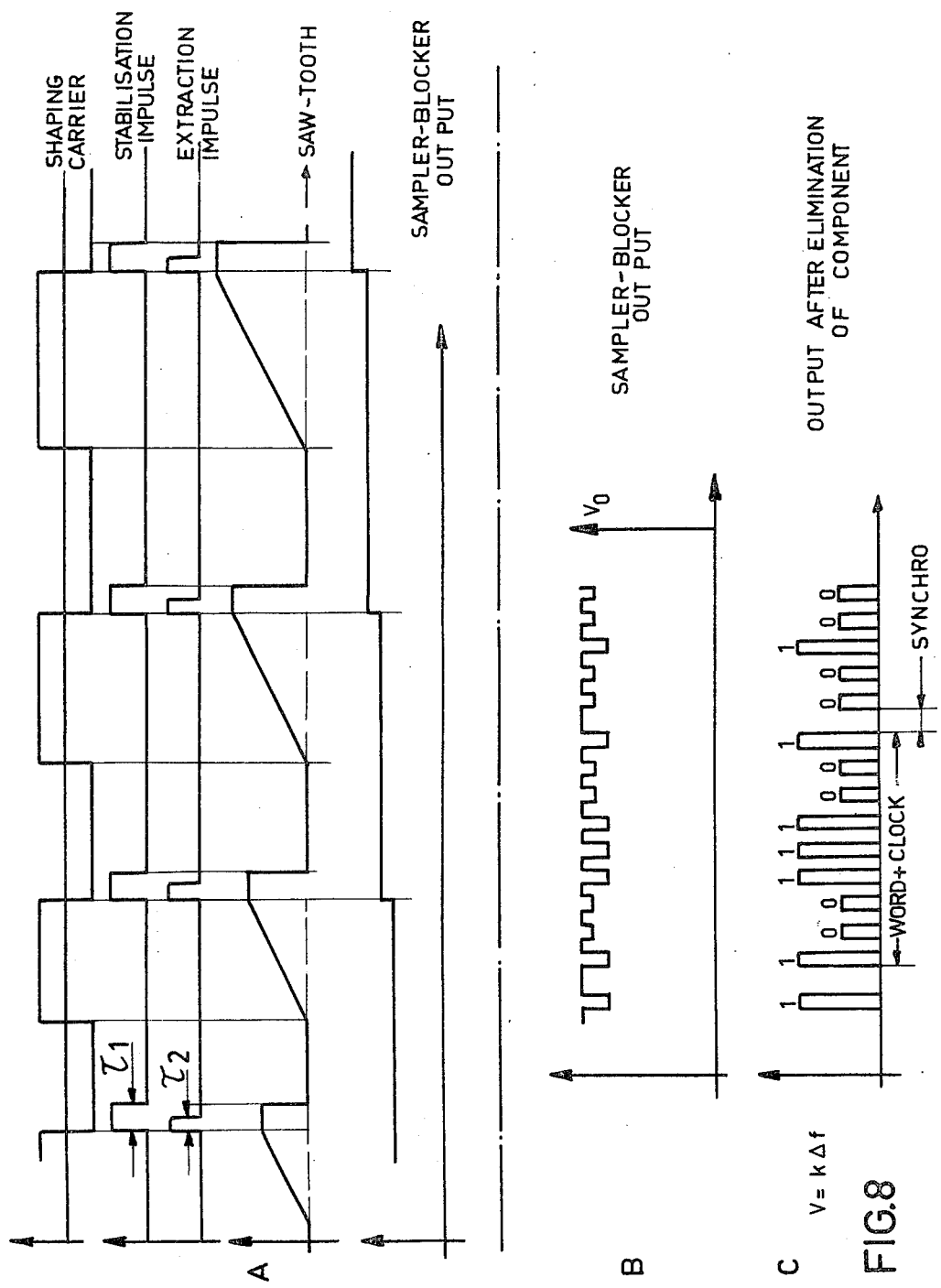

FIGS. 8A–C are diagrams of the times explaining the operation of a demodulator which is part of the aircraft equipment, and FIG. 9 is a functional diagram explaining the use of the data from the preceding demodulator.

Figure 1:
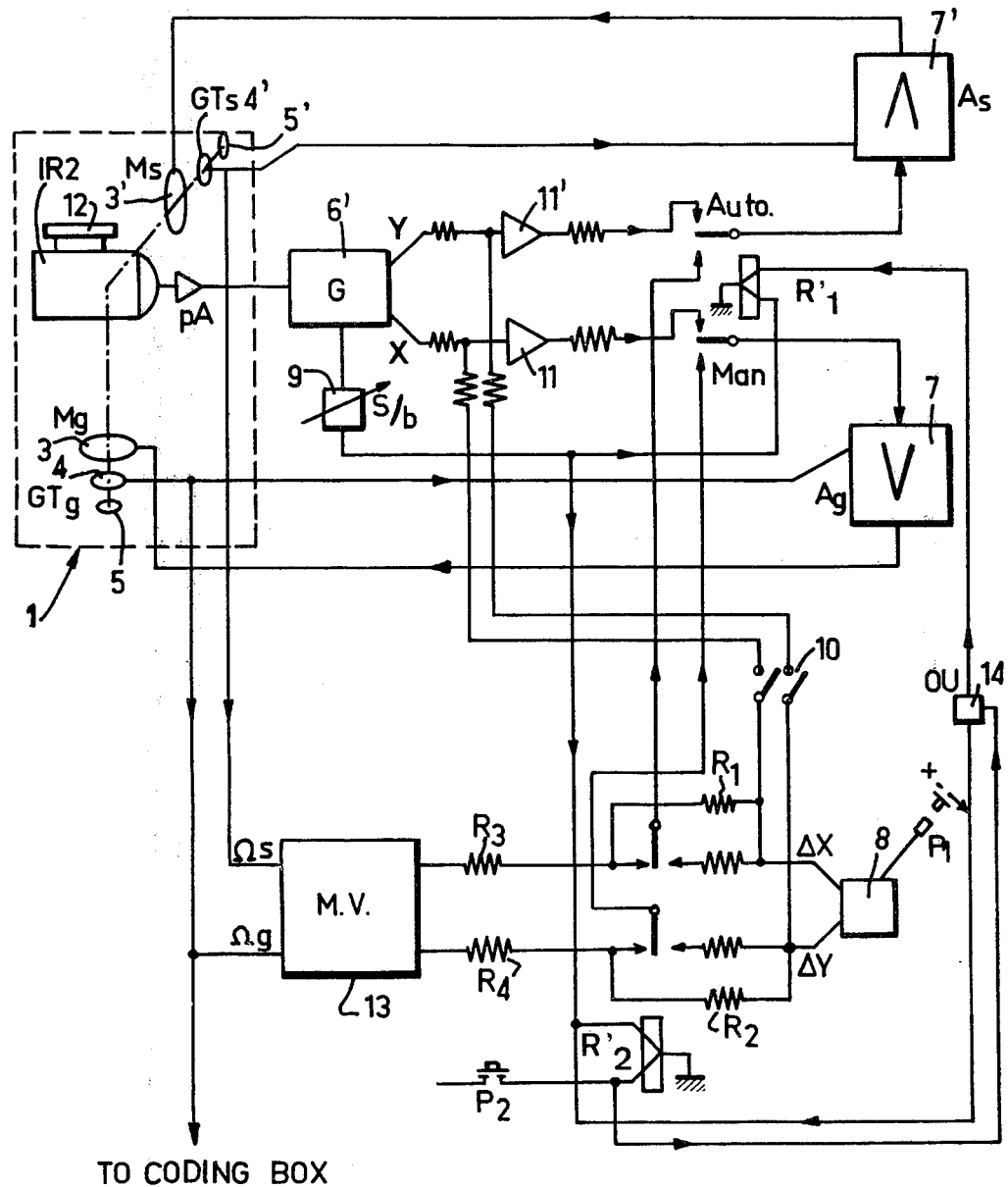
FIG. 1 is a partial functional diagram of one embodiment of the ground station (turret + infra-red circuits)

FIG. 1 shows the simplified functional diagram of the ground equipment.

This ground equipment comprises two main assemblies, namely a turret with an infra-red box and coding box.

The turret 1 has been diagrammatically represented solely by its functional elements which are : the IR head with its scanning system and the two units TACHOMETRIC GENERATOR-MOTOR + ANGULAR CODER which equip each one of the axes, namely the motor M$s$ 3'; and the tachometric generator GT$s$ 4' and the angular coder (resolver) 5' for the inclination axis and the motor M$g$ and the tachometric generator GT$g$ and the angular coder 5 for the bearing axis.

The assemblies MOTOR + TACHOMETRIC GENERATOR are employed for the controller locking whereas the coders (resolvers) provide the angular INCLINATION and BEARING readings.

IR head 2 is known in the art and comprises a telescope which forms on a mechanical scanner the image of the IR source to be tracked. The IR cell thereafter delivers in the known manner to the electronic deviation measuring device (G) 6 a frequency modulated signal which is processed and demodulated to obtain in the form of d-c voltages the angular errors X and Y. These errors are measured with respect to the optical axis of the telescope.

They are respectively transmitted to the inclination and bearing amplifiers A$s$ 7' and A$g$ 7 which in turn supply the torque motors M$s$ 3' and M$g$ 3.

In this way there is obtained after the usual phase corrections, an automatic aiming at or tracking of the IR source by a (theoretical) cancelling out of the angular errors X and Y.

The locator or tracker can operate in three ways :

| MANUAL | priority<br>waiting |
|---|---|
| AUTOMATIC | absolute<br>with aiming correction |
| MEMORY/VELOCITY | priority<br>waiting<br>with velocity correction |

The MANUAL priority operation is attained by maintaining depressed the pushbutton P.1 placed at the end of the control arm 8 thereby to switch bistable relay R'1 to manual operation position Man by way of OR gate 14.

If this pushbutton is released, the apparatus is put into the MANUAL-waiting condition, the relay R.1 remaining switched to the preceding position. The appearance of an IR signal such that the signal/noise ratio S/$b$ is greater than a given (adjustable) threshold, causes the relay R'.1 to switch to the second stable position under the action of a signal from detector 9. The operation is then AUTOMATIC and there must be distinguished the absolute AUTOMATIC operation and the corrected AUTOMATIC operation.

The first mode corresponds to the open position of the switch 10 and the second to the closed position thereof. In the first case, only the voltages from the goniometric part reach the amplifiers A$s$ 7' and A$g$ 7. In the second case, the control arm 8 delivers two voltages $\Delta$ X and $\Delta$ Y which are added to the deviation measurement voltages at the input of the INCLINATION and BEARING pre-amplifiers 11' and 11 and thus determine a position correction which is a function of the angular distance of the lever from its position of rest.

This device is employed within the framework of the checking of the ILS for effecting an "antenna offset" correction. This requires the use of a telescopic view finder 12 which is collimated with the IR telescope.

With the aid of the control arm 8, the operator creates an electrical "false zero" and checks by means of the cross-wires the corresponding displacement.

For example, with a strong lateral wind, the beacon placed at the front of the aircraft serving as the IR source above-mentioned and the ILS antenna placed in the tail are angularly distinct (for example 2 mR). The turret remains automatically aimed at the beacon.

The job of the operator is to manually correct this aiming and to bring it onto the antenna which is the exact reference point.

This operation is essential, since the precision required of the measurement is at least 36 in., namely 1/100 of a degree, whereas the error introduced by the angular noncoincidence of the beacon and antenna would result in an error of 400 inches (2 mR) in the chosen example.

Note that this manual correction is superposed on the automatic operation but is not substituted therefor. The operator does not have to concern himself with the movements of the aircraft but has merely to choose on the latter the point of interest to him. The manual correction is limited to ⅛ of the IR field.

The MEMORY/VELOCITY 13 is manually put into action by the operator when he sees in the view-finder that the source is going to be masked.

The operation of the MEMORY/VELOCITY 13 is obtained by depressing the pushbutton P.2 which simultaneously controls the relay R'.1 by switching it to "MANUAL" and the bistable relay R'.2, which connects, through the contacts of the relay R.1, the "M.V" outputs of memory 13 to the inputs of the amplifiers A$s$ 7' and A$g$ 7

The MEMORY/VELOCITY 13 remains in "Priority" operation as long as the pushbutton P.2 is depressed. If the pushbutton P.2 is released, the MEMORY/VELOCITY 13 remains "waiting" as long as the signal/noise ratio S/$b$ remains less than the acquisition threshold.

If the control arm 8 remains at zero, the operation occurs in absolute MEMORY/VELOCITY, that is to say that the amplifiers A$s$ 7' and A$g$ 7 are piloted only by the MEMORY/VELOCITY.

On the other hand, if the arm 8 is actuated, the voltages it produces are added (by means of a bridge of resistors R.1,R.3 and R.2,R.4) to the output voltages of the MEMORY/VELOCITY 13. There is consequently a modification of the angular velocities $\Omega s$ and $\Omega g$ by an amount which is a function of the angular elongation of the arm.

The latter therefore intervenes for correcting the velocities put into memory.

The angular velocities $\Omega s$ (inclination) and $\Omega g$ (bearing) are delivered by the tachometric generators and electronically stored into MEMORY 13 when the pushbutton P.2 is depressed.

Upon the re-appearance of the source, two cases are possible:

a. The source is within the IR field. If the signal/noise ratio $S/b$ is sufficient, the relay R'.1 switches to "AUTO" and the tracking is resumed.

b. The source is no longer within the IR field, since it has, for example, a velocity higher than that of the turret. The operator then acts on the arm 8 to increase the tracking velocity and thus brings the source back into the IR field. The system is then capable of acquiring the source.

It will be observed that in all cases the MEMORY/-VELOCITY 13 is supressed by action on the pushbutton P.1 unless the pushbutton P.2 is maintained depressed (MV priority).

Figure 2:
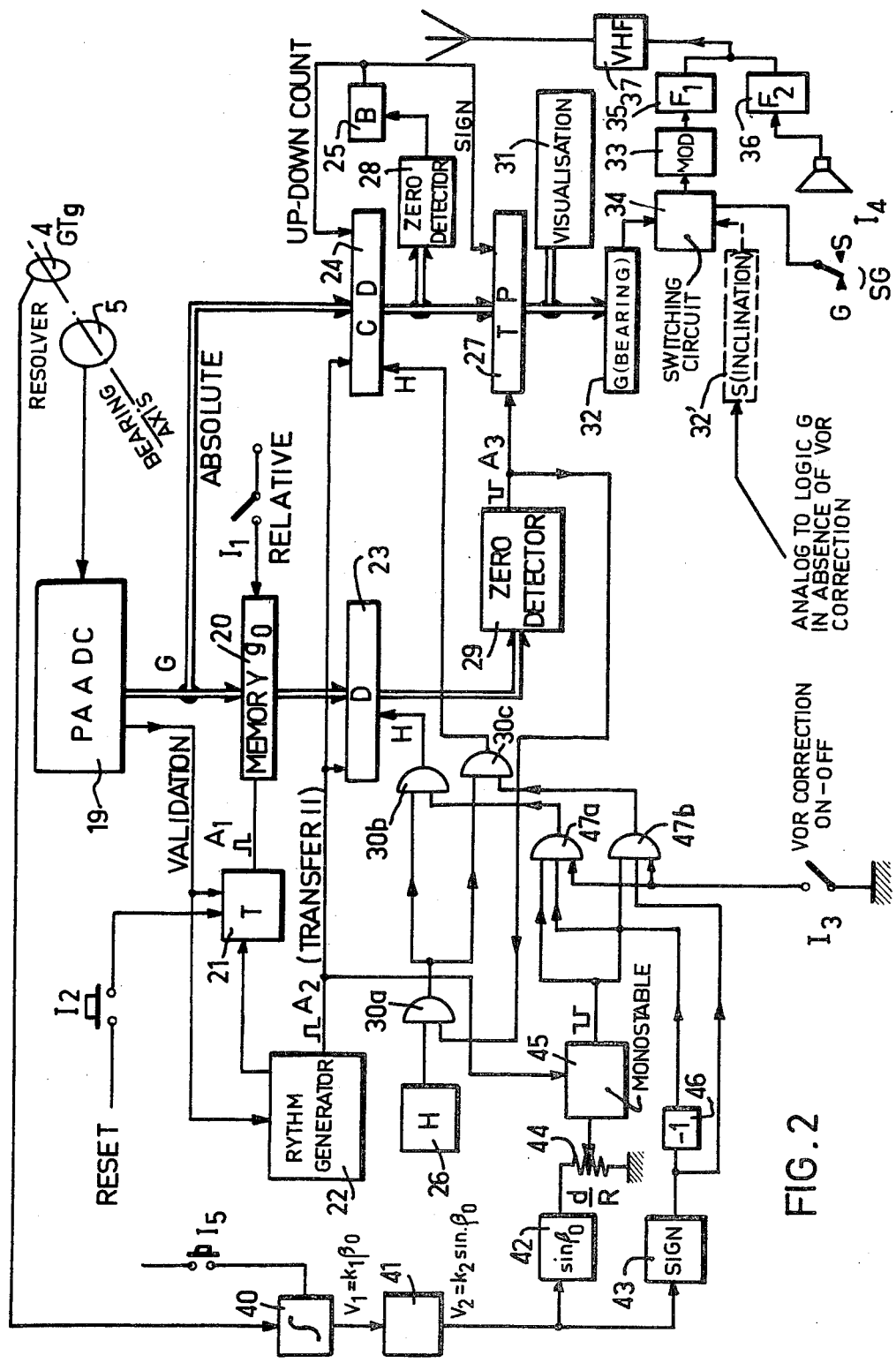
FIG. 2 is a diagram of the ground coding circuits.

Reference will now be made to FIG. 2.

The PAADC (precision angular analog-to-digital conversion) supplies from multipole resolvers 5, 5' the absolute angular data in the form of a digital message which can be renewed at the rate of 250 Hz, the illustrated device being related to the processing of bearing data. It will be understood that inclination data processing is effected by means of a similar device.

This message is delivered in the B C D code up to 0.01°. It is completed by three bits of weights 18 inches, 9 inches and 4.5 inches and by a validity bit. A device including counters 23, 24 converts, at the choice of the operator, this absolute message into a relative message (angle measured from a reference chosen as origin). The absolute or relative data is displayed by means of numerical displays then transferred to a serial register 32 to be discharged to a modulator 33.

A set of filters 35, 36 permits simultaneously transmitting the phone message and the angular messages in the LF channel (300 to 3400 Hz) of a VHF transmitter. The transmission rate is 10 messages per second.

The operator chooses by means of the switch I4 the messages to be transmitted: inclination, bearing or alternated inclination-bearing.

The counting system is completed by a VOR correction device.

When the switch I1 is in the "relative" position, action on the pushbutton I2 triggers the pulse A1 which charges the memory 20 at the value $g_o$ ($g_o$ : absolute angular value corresponding to an aiming at the reference chosen as origin). This pulse is furnished by the timing circuit T21.

The pulse A.2, delivered by the frequency generator 22, simultaneously gates the parallel transfer of the data $g_o$ in the down counter D23 and the parallel transfer of the data G in the up-down counter CD24. The flip-flop B25 gated by zero detector 28 which furnishes the up counting or down counting order to counter CD24 is pre-set at the down counting position by the same pulse.

As soon as the pulse A.2 is erased, the clock H26 simultaneously empties the down counter D23 and the up-down counter CD24. When the contents of D reaches the value 0, the pulse A.3 from detector 29, on one hand, blocks the clock inputs of D and CD by way of gates 30a, 30b, 30c, and, on the other, triggers the parallel transfer of the data G-$g_o$ contained in CD into the buffer register TP27. The flip-flop B25 furnishes the polarity of G-$g_o$.

The result provided with its polarity is stored in the buffer TP27 for display purposes in visualization device 31 until the new sequence.

The shift register S32 then takes the message from the buffer register TP27 and feeds it serially to the modulator 33 by means of the data generated by the frequency generator 22 (the connection not being shown).

A switching circuit 34, controlled by the switch I4, permits a choice of the message to be transmitted: inclination, bearing or alternating inclination-bearing, the inclination-data being yielded by a device not shown, similar to the device of FIG. 2, of which register 32' alone is shown.

It will be observed that if the operator has chosen to transmit the absolute message by means of the switch I1, the contents of the memory 20 remains equal to zero. Consequently, he transmits the value G-O.

Reference will now be made to FIGS. 3–9.

To compare the angle G, measured by the VOR antenna (FIG. 3), with the angle $\beta$ measured by the turret, the following correction must be made to the latter:

$$\Delta \beta = (d/R) \sin \beta o$$

wherein R stands for the VOR orbit radius, d the distance from the turret to the antenna and $\beta_o$ the angle formed by the turret with respect to the direction AA', shown in dotted line, defined by the turret and the antenna.

The correction consists in introducing a counting error proportional to the value $(d/R) \sin \beta o$ in the Absolute-Relative converting device.

$\Delta o$ is obtained by integrating the output voltage of the tachometric bearing generator G.Tg 4' by means of integrator 40. A pushbutton I5 permits zero/setting the integrator when the turret is aimed in the direction AA'. The device further comprises:

An analog computer 41 which converts the voltage $V_1 = k1\ \beta o$ into a voltage $V_2 = k2 \sin \beta o$.

Two analog circuits 42, 43 which permit simultaneously obtaining:

$$V'_2 = |k2 \sin \beta o| \text{ and } V_3 = \text{sign of } \sin \beta o.$$

A potentiometer 44 which permits displaying the value $d/R$.

The voltage $V_4 = d/R\ |\sin \beta o|$ is employed for modulating the time $\tau$ of a monostable vibrator 45 gated by the pulse A2.

$$\tau = k\ (d/R)\ |\sin Bo|$$

According to the sign of $\sin \beta o$, the pulse of duration $\tau$ delivered by the monostable vibrator 45, inhibits the clock of the down counter D23 or of the up-down counter CD24 by modifying the operation G-go by the value $d/R \sin \beta o$.

The switch I3 permits cancelling out the correction in the case of ILS checking.

It should be noted that the inclination-data processing device does not comprise the VOR correction device, as indicated in FIG. 2.

Figure 3:
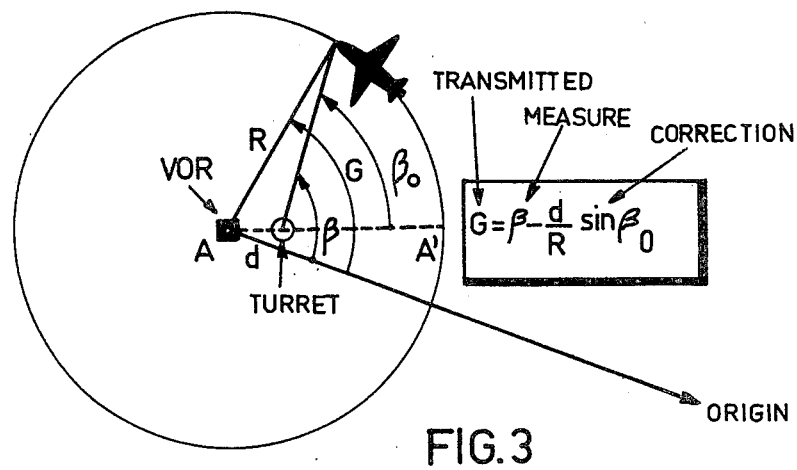
FIG. 3 is a diagram of the application of the device to the checking of a VOR system with automatic correction.

There will now be described the mode of transmission of the data with reference to FIGS. 2 and 3. The device according to the invention permits a simultaneous transmission :

in the band 3000 to 3400 Hz the data of angular inclination and bearing, the clock and the synchronization signal.

in the band 300 to 2000 Hz a telephone communication.

The active filters 35 and 36 employed are of the low-pass and high-pass type afforded by cells of 12 dB per octave. The band limits 300 and 3400 Hz are defined by the LF channel of the transmitter.

Figure 5:
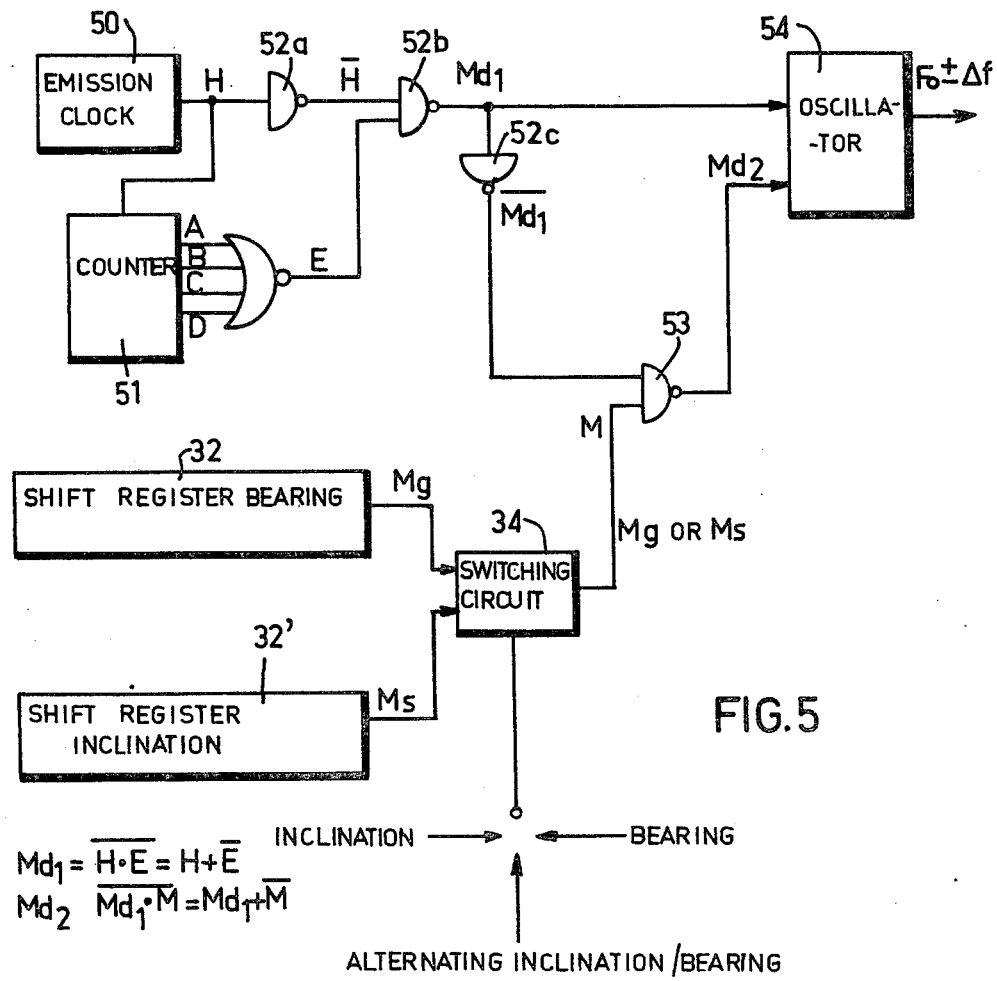
FIG. 5 is a functional diagram of a modulator which is part of the ground equipment.
Figure 4:
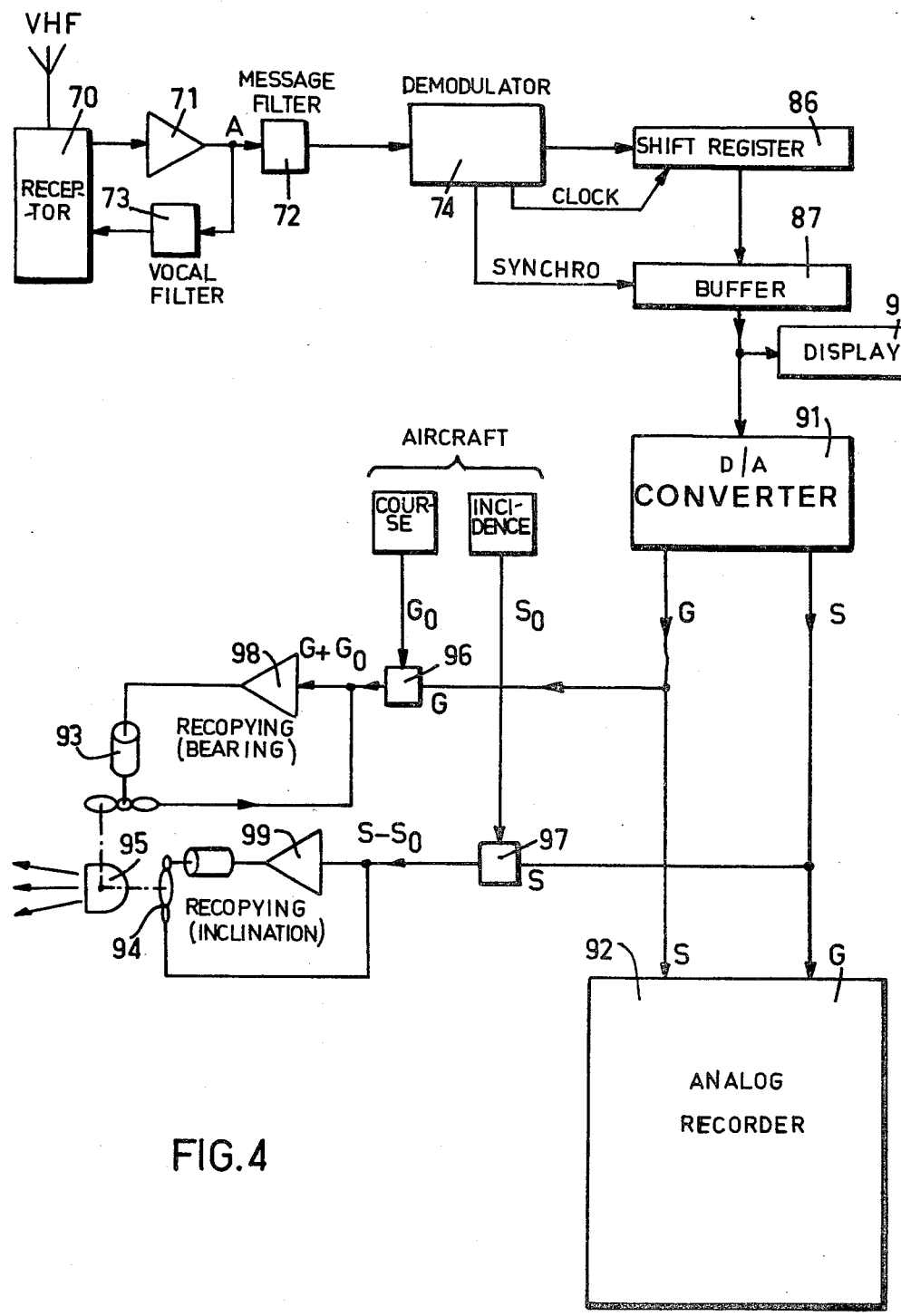
FIG. 4 is a functional diagram of the equipment carried by the aircraft.
Figure 6:
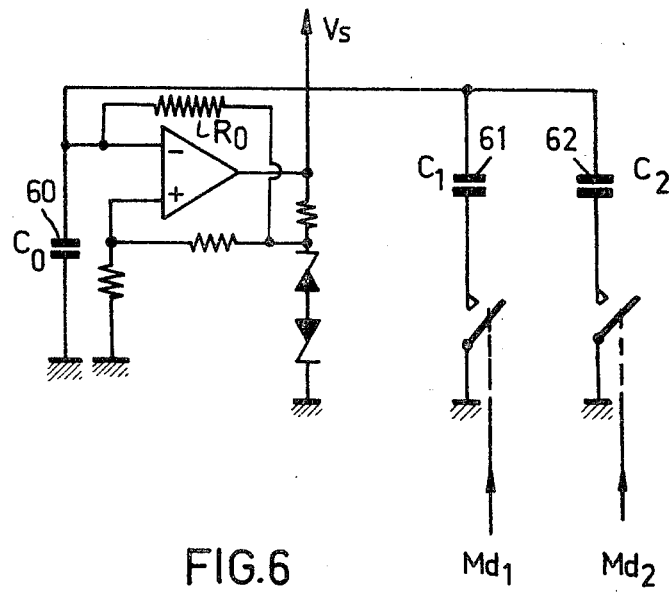
FIG. 6 is a diagram of an oscillator which is part of the modulator shown in FIG. 5.

Modulator 33 is shown in detail in FIG. 5 and comprises a clock 50 generating a signal H, a counter 51 delivering an end-of-word pulse E which is the synchronization word, inversion gates 52a, 52b and 52c and a gate 53, and an oscillator illustrated in detail in FIG. 6. Modulator 33 is connected through gate 53 to the switching circuit 34 of FIG. 2.

Figure 7:
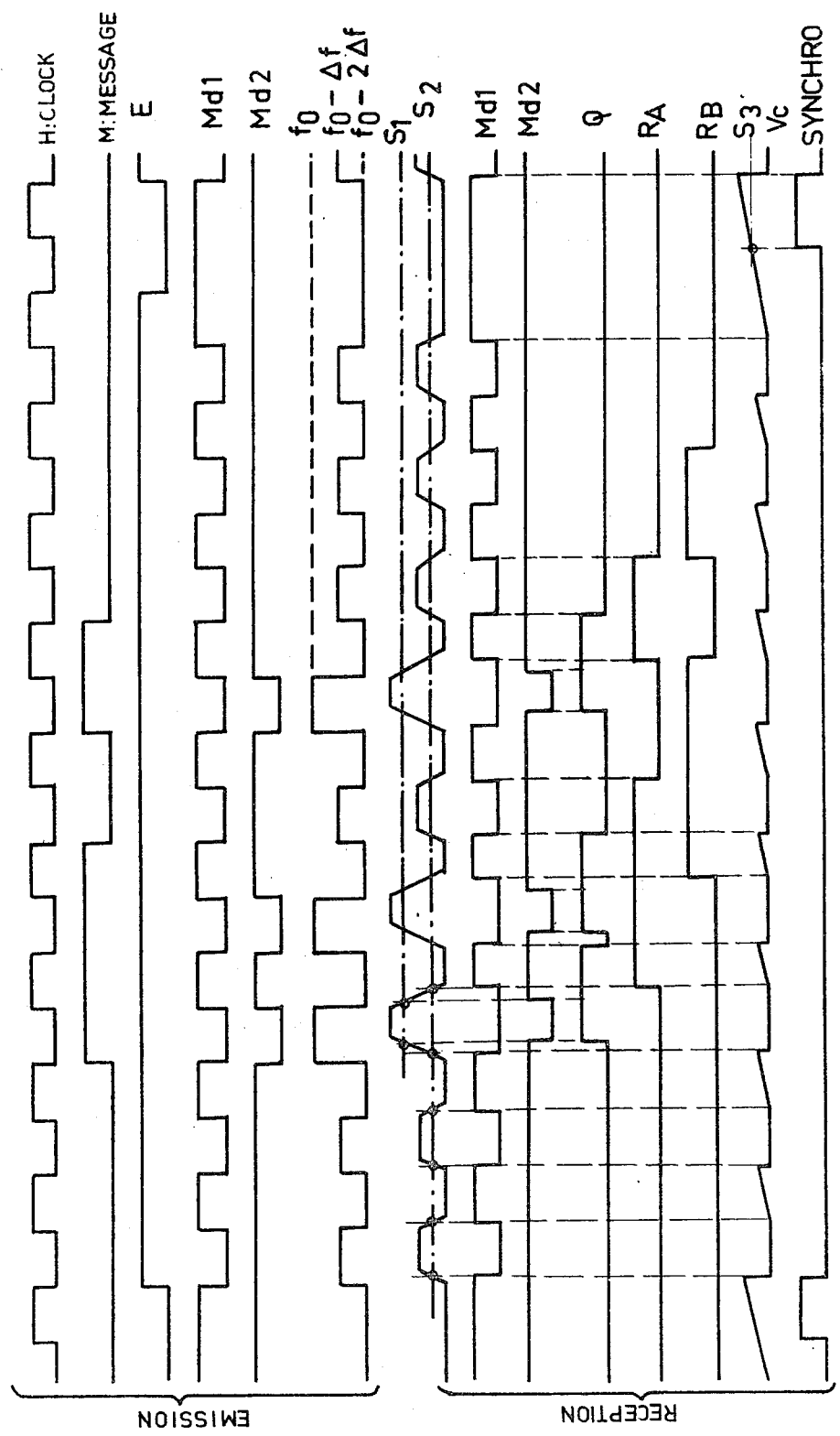
FIG. 7 is a diagram of the times for a 9 bit message.

Oscillator 54 is modulated by signals $Md_1$ and $Md_2$ shown in FIG. 7 and defined as $$Md_1 = H + \bar{E}$$

$$Md_2 = Md_1 + \bar{M},$$

wherein $M$ is the information word from switching circuit 34 which is to be transmitted. The astable oscillator 54 comprises three capacitors 60, 61, 62 having respective capacitances of $C_0$, $C_1$ and $C_2$. Its frequency is determined by the variable capacitance $$C = C_0 + C_1 \cdot Md_1 + C_2 \cdot Md_2$$

The emitted frequency is therefore of a form $f = f_o - \Delta f \cdot Md_1 - \Delta f \cdot Md_2$ with $F_o$ function of $C_o$ and $R_o$.

The characteristics of the transmission are as follows:
Velocity : 400 bauds for a band of 3000 to 3400 Hz.
Acceptable dynamic of the signal at the input of the filter : 500.

Performance as a function of the signal/noise ratio : no error for $S/b \geq 5$ in the band 3000 to 3400 Hz.

The VHF receiver 70 of the aircraft delivers, at point A (FIG. 4), a compound information previously passed in amplifier 71 from which is derived by means of two filters :
the sound at the output of the voice filter 73
the digital message at the output of the "message" filter 72.

The voice filter 73 corresponds to the wide part of the LF spectrum transmitted (300 to 2000 Hz), whereas the "message" filter corresponds to the higher part of the spectrum (3000 to 3400 Hz).

The signal is then shaped as shown in FIG. 8A and fed to demodulator 74.

Demodulator 74, as indicated in FIG. 9, comprises a discriminator 80 whose essential characteristic is to furnish a d-c voltage proportional to the semi-period of the incoming signal with a negligible time constant and a rate of residual which is practically nil.

The discriminator is constituted by an integrator which delivers a saw-tooth voltage whose maximum amplitude, proportional to the semi-period, is set during the time $\tau_1$ so as to be used during the time $\tau_2 < \tau_1$ by a sampler-blocker (see the diagram of the times, FIGS. 8A – C).

At the end of the time $\tau_1$, the saw-tooth voltage is reset to zero by means of the negative alternance of the MF signal.

The pulses of width $\tau_1$ and $\tau_2$ are produced from the negative edge of the shaping carrier (MF).

The voltage delivered by the blocker-sampler (FIG. 8B) is proportional to the period. After comparison with its peak value, the d-c component $V = k\Delta f$ is finally extracted. The level of the signal thus obtained is practically independent of the frequency stability of the transmitting oscillator.

Three amplifiers 82, 82, 83 defining thresholds $S_1$, $S_2$, $S_3$ respectively derive the data $Md_2$, $Md_1$ and the synch word. The definitively recover the message, this device must be completed by the receiver logic circuitry shown in FIG. 9.

Signal $Md_1$ from amplifier 81 is passed in inversion gate 84 and fed to the clock input of a D-type flip-flop 85, and signal $Md_2$ from amplifier 82 is fed to the preset input of flip-flop 85. The resulting output Q (see FIG. 7) is entered into shift register 86 and transferred in buffer register 87 also supplied with sync signal.

This data is displayed in degrees and tenths and hundredths of a degree by means of electroluminescent diode display device 90. A converter 91 thereafter converts the digital data into analog data. The analog outputs S and G are d-c voltage which vary from 0 to 10 V.

They are fed:
to the analog recorder 92
to the recopying servomechanisms 93, 94 of the beacon 95.

The analog recorder currently employed is of the pen type. Its band pass is of a few Hz.

The recopying servomechanisms 92, 94 have for function to orient, relative to the reference axes of the aircraft, the axis of the beacon 95 so that it makes :
an angle (G + Go) with the horizontal projection of the longitudinal reference of the aircraft;
an angle (S − So) with the transverse or longitudinal reference of the aircraft.

The angles (G + Go) and (S − So) are delivered by two algebraic adders 96, 97 which receive, on one hand, the data from the aircraft:
Course = Go.
Incidence = So.
and, on the other, the data S and G coming from the Digital/Analog converter 91.

They are applied to the input of the recopying systems including amplifiers 98, 99 which control the two servomotors orienting the beacon.

What we claim is:

1. A device for checking radio aids to air navigation, comprising an infra-red tracking unit including an infra-red scanning head mounted on a ground-based turret and means for processing the data from said scanning head, a ground-based VHF transmitter-receiver, a VHF transmitter-receiver aboard a calibrating aircraft, an orientable beacon fixed on said aircraft, said turret comprising two units for controlling the scanning head orientation with respect to inclination and bearing, respectively, each of said units comprising a tachometric generator-motor assembly and an angular coder mounted on the inclination axis and the bearing axis, respectively, said motors being supplied with the output voltages of said processing means, said output voltages representing the bearing and inclination of said beacon with respect to the optical axis of the scanning head, orientation servomotors, the orientable beacon on board the aircraft being controlled by said orientation servomotors supplied by a recopying system supplied by signals representing the position of the angular coders of the turret with respect to a gyroscopic reference system in the aircraft, said gyroscopic reference system coinciding with a reference system on the ground.

2. A device as claimed in claim 1, including an analog-to-digital converter between the output of each angular coder and the input of said ground-based VHF transmitter-receiver.

3. A device as claimed in claim 2, wherein said ground-based VHF transmitter-receiver provides three-level modulation of a signal including the data from said converter, synchronization and clock signals, and transmits the resulting modulated signal together with speech signal within the LF spectrum in a single VHF channel.

4. A device as claimed in claim 1, including a view-finder integral with the scanning head, manual means for generating correction data, and means for superimposing said correction data on said data from said scanning head.

5. A device as claimed in claim 1, including memory means for storing the outputs of said tachometric generators, the outputs of said memory means being applied to said motors, and manual means for operating said memory means.

6. A device as claimed in claim 2, including analog computing means for deriving a VOR correction signal from the output of the tachometric generator relative to bearing, said correction signal being digitalized and added to the output of said analog-to-digital converter.

7. A device as defined in claim 1, including an analog-to-digital converter between the output of each angular coder and the input of said ground-based VHF transmitter-receiver, said ground-based VHF transmitter-receiver providing three-level modulation of a signal including the data from said converter, synchronization and clock signals, transmitting the resulting modulated signal together with speech signal within the LF spectrum in a single VHF channel, a view-finder integral with the scanning head, manual means for generating correction data, means for superimposing said correction data on said data from said scanning head, memory means for storing the outputs of said tachometric generators, the outputs of said memory means being applied to said motors, manual means for operating said memory means, analog computing means for driving a VOR correction signal from the output of the tachometric generator relative to bearing, said correction signal being digitalized and added to the output of said analog-to-digital converter.

* * * * *